M. R. HULL.
COMBINED SUNSHADE AND VIZOR FOR VEHICLE WINDSHIELDS.
APPLICATION FILED JUNE 3, 1919.
1,363,510.
Patented Dec. 28, 1920.
2 SHEETS—SHEET 2.
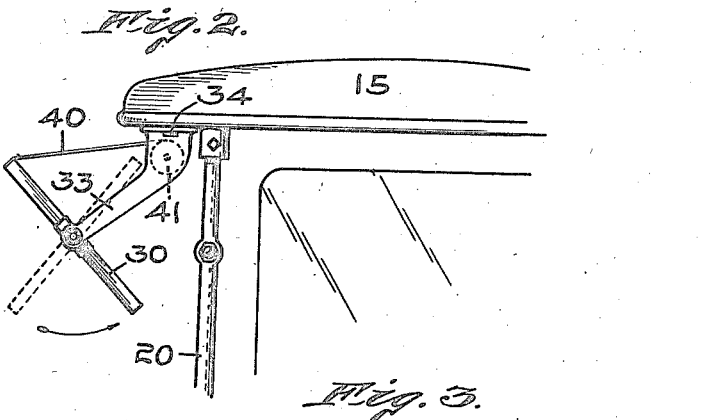
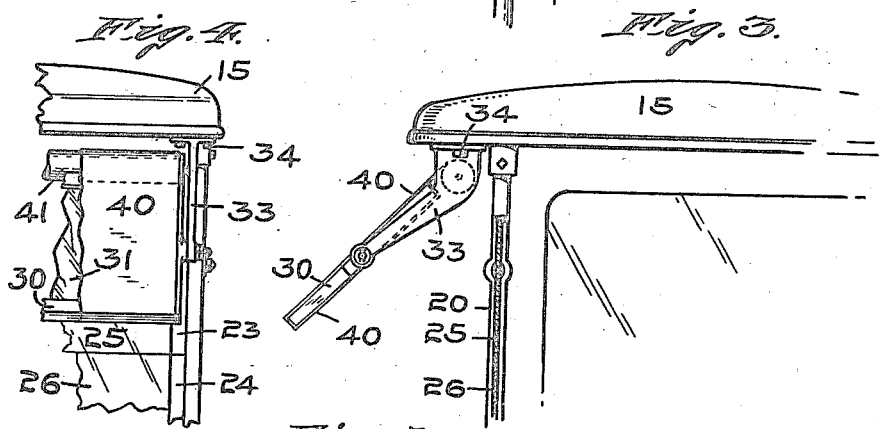
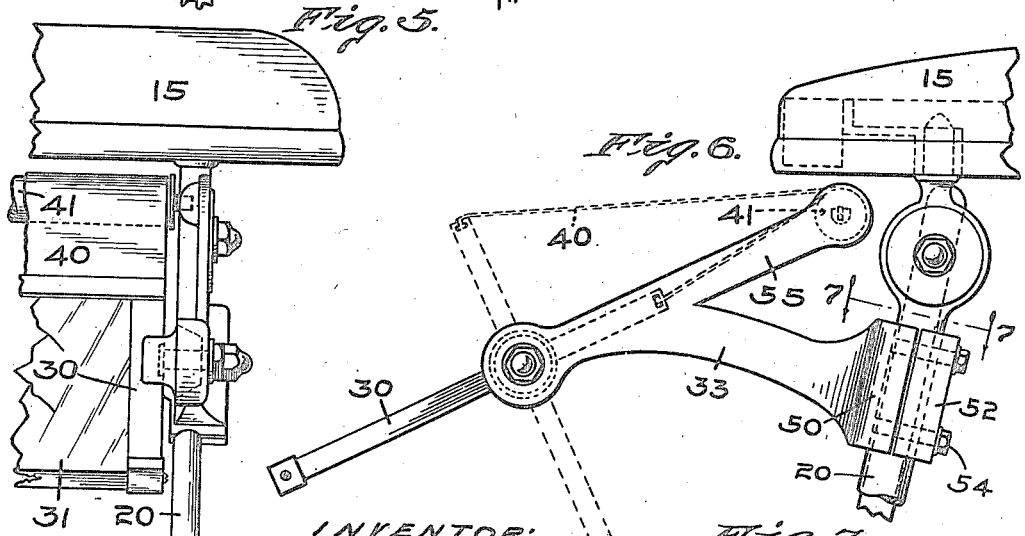
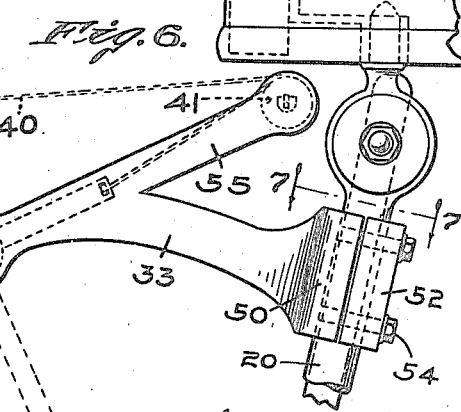
INVENTOR:
Matthew R. Hull,
By Frank W. Woerner,
ATTORNEY.
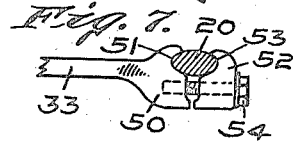

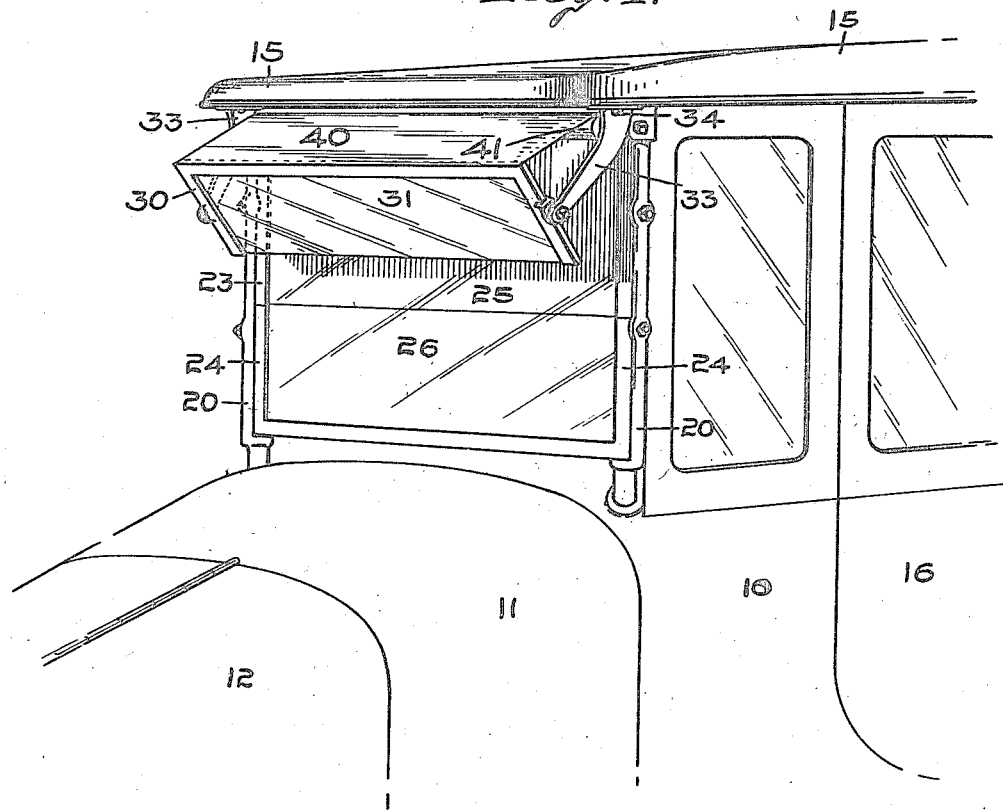

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION.

COMBINED SUNSHADE AND VIZOR FOR VEHICLE-WINDSHIELDS.

1,363,510.    Specification of Letters Patent.    Patented Dec. 28, 1920.

Application filed June 3, 1919. Serial No. 301,441.

*To all whom it may concern:*

Be it known that I, MATTHEW R. HULL, a citizen of the United States, residing at Connersville, in the county of Fayette and State of Indiana, have invented certain new and useful Improvements in Combined Sunshades and Vizors for Vehicle-Windshields, of which the following is a specification.

This invention relates to a combined sunshade and vizor which is particularly adapted for use in connection with windshields in automobile construction; and one of the objects of the invention consists in the provision of a vizor of the above character which may be tilted into the desired degree of angularity relatively to the adjacent surface plane of the windshield so that a portion of the surface of the latter may be protected against rain and the accumulation of snow which obscures the vision of the driver in operating a motor vehicle; and further, to provide means which is connected to and actuated by the vizor for shading both the surface of the glass of the vizor and the surface of the windshield back of the vizor, thereby removing either the direct rays of the sun and from the street lamps at night, or those rays of lights which may be refracted, in passing through the angular plane surface of the vizor, into the plane of vision of the driver; and further to provide a combined vizor and sunshade whereby the sunshade can be depressed to a point to so shade and protect the surface plane of the windshield as to not impair the visibility of the driver by the constantly changing position of the sun.

I accomplish the above objects of the above invention, and such others as may appear from a perusal of the following description and claims, by means of the construction illustrated in the accompanying drawings, forming a part hereof, in which—

Figure 1 is a fragmentary detail perspective view of the forward portion of a motor car having an inclosed body of the limousine, sedan or demountable type. Fig. 2 is a fragmentary detail side elevation of the forward and upper portion of a permanent built motor vehicle top, showing my combined vizor and sunshade in one position. Fig. 3 is a view similar to Fig. 2, except that the vizor has been moved into a different position from that shown in Fig. 2. Fig. 4 is a fragmentary detail view in front elevation of the construction shown in Fig. 3. Fig. 5 is a fragmentary detail view in front elevation showing a modified form for attaching the combined vizor and sunshade to a conventional style cape or foldable top. Fig. 6 is a side elevation of the construction shown in Fig. 5. Fig. 7 is a fragmentary detail view, on the line 7—7 in Fig. 6.

Referring to the drawings, 10 represents the body of the motor vehicle, 11 the cowl; and 12 the hood which are common in motor vehicles. 15 represents the deck of the inclosed body, and 16 a door leading therein. 20 represents a pair of upright parallel members which form the forward support for the deck 15, and members 20 also provide the means for supporting therebetween sections 23 and 24 comprising the windshield. Section 23 forms the means for mounting the upper glass 25, and section 24 for mounting the lower glass 26 of the windshield.

The vizor to which this invention is directed contemplates a vizor frame 30 which contains a pane of glass 31, said frame 30 being pivotally mounted at each end and midway of its width between a pair of arms 33 which, in case of a solid built top are securely attached to the under and projecting ledge of deck 15 by means of the bolts 34, or similar permanent fastening devices. Vizor frame 30 is arranged a sufficient distance in advance of the windshield to enable it to be moved into any degree of angularity relatively to the surface plane of the latter. The place of its attachment and its pivotally mounting enables the lower end of the vizor frame to be brought into close proximity with the surface plane of the windshield and thereby protect more fully said surface plane immediately back of the vizor than would be possible with the vizors commonly in use and which are pivoted at their upper corners and near the surface plane of the windshield, so that the lower edges of the vizors may be moved outwardly and thereby enlarge the gap between the vizor and the windshield for the admission of air and water blown therebetween. It will be observed in examining Fig. 1, where the lower end of the vizor is moved into close proximity of the surface plane of the windshield for protecting the windshield back of the vizor, that the vizor is placed into a plane of angularity that would admit rain and also the sun's rays through the intervening space between its upper end and the adjacent edge of the deck 15 and which would destroy its utility unless other means were provided to close said intervening space. To overcome this objection I introduce a sunshade comprising a curtain 40, composed of rubber fabric or similar flexible material, which is attached to and moves with the vizor frame 30. The opposite end of curtain 40 is wound upon a spring actuated roller 41 suitably mounted between arms 33, whereby when the vizor frame 30 is swung upon its pivotal bearings curtain 40 will either play in or out, this depending upon the direction the vizor frame is moving, thereby closing the space between the upper edge of the vizor frame and the adjacent edge of deck 15.

It may be found in driving toward the sun, when the latter is at a low inclination, that the rays of light are so nearly on a horizontal plane that the glass 31 of the vizor can not be placed into a degree of angularity without causing the rays to be partially deflected and possibly cause a glare within the driver's field of vision. To obviate this possibility, the vizor frame is susceptible of being moved a complete revolution thereby wrapping the curtain 40 entirely around the visor frame and render the glass 31 opaque, thereby removing the possibility of refraction of the rays of light in passing through the unprotected glass.

In Figs. 5, 6 and 7, I have merely shown a modified construction of the means for attaching the vizor supporting arms 33 to the upright members 20 of an ordinary wind-shield frame, commonly employed in connection with the cape or foldable type of automobile tops. In view of the fact that many drivers prefer to drive with the top down the latter cannot be employed for attaching the supporting arms of the vizor and sunshade. In this instance each supporting arm 33 terminates in a jaw 50 which is provided with a channel, as at 51, to receive one edge of upright 20 for supporting the front end of a foldable top. The clamping jaw 52 is provided with a groove 53 to receive the opposite edge of the upright 20, and by means of the bolts 54 jaws 50 and 52 are tightly clamped against said uprights. This attachment also provides means for adjusting supporting arms 33 vertically so as to bring the vizor into proper position relatively to the lower and adjacent edge of the top. Arms 33 are each provided with an extension 55 which provides means for mounting and holding the spring actuated roller 41. As before stated the construction shown in Figs. 5, 6 and 7 is only modified in so far as the supports are concerned, in order to accommodate my combined vizor and sunshade to motor vehicles having a foldable top, and the advantages attained by means of the adjustability of the vizor and sunshade, are in nowise altered but remain the same.

Having thus fully described my said invention, what I desire to secure by Letters Patent, is—

1. In combination with a vehicle wind shield, of a spring actuated roller, a curtain arranged to wind thereon, means comprising a vizor forming an attachment for the free end of said curtain, and means pivotally supporting said vizor throughout its range of angular movement relatively to the surface plane of said wind shield.

2. In combination with a vehicle wind shield, a spring actuated roller, a curtain arranged to wind thereon, means comprising a vizor forming an attachment for the free end of said curtain, and means forming a support for both the roller and vizor.

3. In combination with a vehicle wind shield, a spring actuated roller, a curtain arranged to wind thereon, a vizor arranged in advance of said wind shield and susceptible of being moved to bring either edge into close proximity to the surface plane of said wind shield, means for attaching the free end of the curtain to said vizor, and means for supporting said vizor in operative position.

4. In combination with a vehicle wind shield, a spring actuated roller, a curtain arranged to wind thereon, a vizor arranged in advance of said wind shield and forming an attachment for the free end of said curtain, means for supporting both the roller and wind shield, and means for changing the vertical position of said vizor relatively of said wind shield.

5. In combination with a vehicle wind shield, a pair of arms supported thereby, a movable vizor arranged between said arms and having a pivotal connection intermediate its width in said arms, a spring actuated roller arranged between and supported by said arms, and a curtain arranged to wind upon said roller and having its free end connected to said movable vizor.

6. In combination with a vehicle wind shield, a pair of arms supported thereby, a revoluble vizor arranged between said arms and having a pivotal connection intermediate its width in said arms, a spring actuated roller arranged between and supported by said arms, and a curtain arranged to wind upon said roller and having its free end connected to said revoluble vizor.

7. In combination with a vehicle wind shield, a pair of arms supported thereby, a revoluble vizor comprising a quadrilateral figure pivoted intermediate the corners of its narrow sides to said arms, a spring actuated roller arranged between and supported by said arms, and a curtain arranged to wind upon said roller and having its free end connected to said revoluble vizor.

In witness whereof, I have hereunto set my hand and seal at Connersville, Indiana, this 21st day of May, A. D. one thousand nine hundred and nineteen.

MATTHEW R. HULL. [L. S.]